United States Patent
Yamamoto et al.

(10) Patent No.: US 10,811,708 B2
(45) Date of Patent: Oct. 20, 2020

(54) FUEL CELL SYSTEM AND CONTROL METHOD THEREOF

(71) Applicant: TOYOTA JIDOSHA KABUSHIKI KAISHA, Toyota-shi, Aichi-ken (JP)

(72) Inventors: Kazuo Yamamoto, Toyota (JP); Shigeki Hasegawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/269,893

(22) Filed: Feb. 7, 2019

(65) Prior Publication Data

US 2019/0260042 A1    Aug. 22, 2019

(30) Foreign Application Priority Data

Feb. 21, 2018    (JP) ................. 2018-028927

(51) Int. Cl.
    *H01M 8/04492*    (2016.01)
    *H01M 8/04089*    (2016.01)
    *H01M 8/0432*    (2016.01)
    *H01M 8/0438*    (2016.01)
    *H01M 8/04746*    (2016.01)

(52) U.S. Cl.
    CPC ....... *H01M 8/045* (2013.01); *H01M 8/04089* (2013.01); *H01M 8/04358* (2013.01); *H01M 8/04388* (2013.01); *H01M 8/04402* (2013.01); *H01M 8/04753* (2013.01); *H01M 2250/20* (2013.01)

(58) Field of Classification Search
CPC .... H01M 2/02; H01M 8/04492; H01M 8/045; H01M 8/04089; H01M 8/04358; H01M 8/04402; H01M 8/04753; H01M 8/04388; H01M 2250/20
See application file for complete search history.

(56) References Cited

U.S. PATENT DOCUMENTS

2012/0141899 A1*    6/2012   Yamanaka ........ H01M 8/04291
    429/444

FOREIGN PATENT DOCUMENTS

JP    2007157621 A    6/2007
JP    2015099727 A    5/2015

* cited by examiner

*Primary Examiner* — Osei K Amponsah
(74) *Attorney, Agent, or Firm* — Dickinson Wright PLLC

(57) ABSTRACT

Provided is a fuel cell system including: a pressure measurement unit that acquires a measured pressure value of an anode gas at an anode gas inlet or an anode gas outlet of a fuel cell; and a water amount estimation unit. The water amount estimation unit obtains, from a plurality of circumstantial parameters including an open time of an injector provided in the anode gas supply passage and the measured pressure value measured before the injector is opened, an assumed pressure rise that is assumed based on the water amount being equal to the water amount threshold value. When a measured pressure rise of the measured pressure value resulting from opening the injector is larger than the assumed pressure rise, the water amount estimation unit estimates that the water amount is larger than the water amount threshold value.

4 Claims, 5 Drawing Sheets

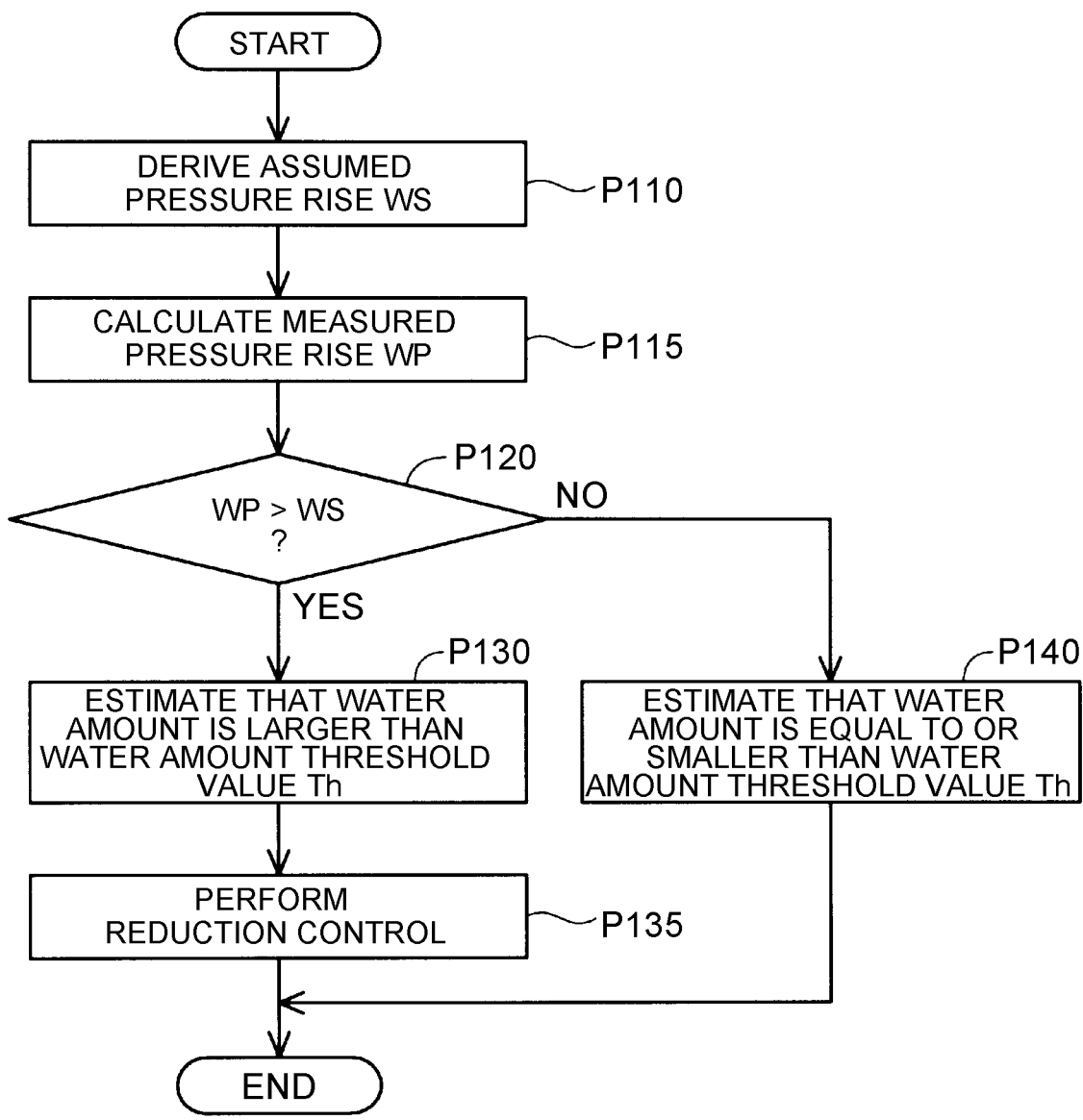

FUEL CELL SYSTEM AND CONTROL METHOD THEREOF

INCORPORATION BY REFERENCE

The disclosure of Japanese Patent Application No. 2018-028927 filed on Feb. 21, 2018 including the specification, drawings and abstract is incorporated herein by reference in its entirety.

BACKGROUND

1. Technical Field

The present disclosure relates to a fuel cell system and a control method thereof.

2. Description of Related Art

Japanese Patent Application Publication No. 2015-099727 (JP 2015-099727 A) discloses a method of estimating a water amount inside a fuel cell by using an impedance of the fuel cell.

SUMMARY

However, the water amount inside the fuel cell estimated in JP 2015-099727 A is a water amount combining a water amount on an anode side and a water amount on a cathode side, and is therefore inadequate for accurately estimating the state inside the fuel cell. A technique for estimating a water amount on the anode side has been needed to accurately estimate the state on the anode side.

(1) A first aspect of the present disclosure relates to a fuel cell system including: a fuel cell that generates electricity by an electrochemical reaction between an anode gas and a cathode gas; an anode gas supply passage that supplies the anode gas to the fuel cell; an injector provided in the anode gas supply passage; a pressure measurement unit that acquires a measured pressure value of the anode gas at an anode gas inlet or an anode gas outlet of the fuel cell; and a water amount estimation unit that estimates whether a water amount on an anode side of the fuel cell is larger than a predetermined threshold value. The water amount estimation unit obtains, from a plurality of circumstantial parameters including an open time of the injector and the measured pressure value measured before the injector is opened, an assumed pressure rise that is assumed based on the water amount being equal to the predetermined threshold value. When a measured pressure rise of the measured pressure value resulting from opening the injector is larger than the assumed pressure rise, the water amount estimation unit estimates that the water amount is larger than the predetermined threshold value. The fuel cell system of this aspect can estimate the water amount on the anode side of the fuel cell.

(2) The fuel cell system of the above aspect may include a temperature measurement unit that acquires a measured temperature value of the fuel cell, and the plurality of circumstantial parameters may include the measured temperature value. The fuel cell system of this aspect can more accurately estimate the water amount on the anode side of the fuel cell by taking also the temperature of the fuel cell into account.

(3) The fuel cell system of the above aspect may further include a reduction control unit that performs reduction control of reducing the water amount when the water amount is estimated to be larger than the predetermined threshold value. The fuel cell system of this aspect can reduce the water amount on the anode side of the fuel cell when this water amount is too large.

(4) A second aspect of the present disclosure relates to a control method of a fuel cell system including a fuel cell that generates electricity by an electrochemical reaction between an anode gas and a cathode gas, an anode gas supply passage that supplies the anode gas to the fuel cell, and an injector provided in the anode gas supply passage. This control method includes: obtaining, from a plurality of circumstantial parameters including an open time of the injector and a measured pressure value at an anode gas inlet or an anode gas outlet of the fuel cell measured before the injector is opened, an assumed pressure rise that is assumed based on a water amount on an anode side of the fuel cell being equal to a predetermined threshold value; and when a measured pressure rise of the measured pressure value resulting from opening the injector is larger than the assumed pressure rise, estimating that the water amount is larger than the predetermined threshold value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart in the second embodiment.

DETAILED DESCRIPTION OF EMBODIMENTS

A. First Embodiment

Figure 1:
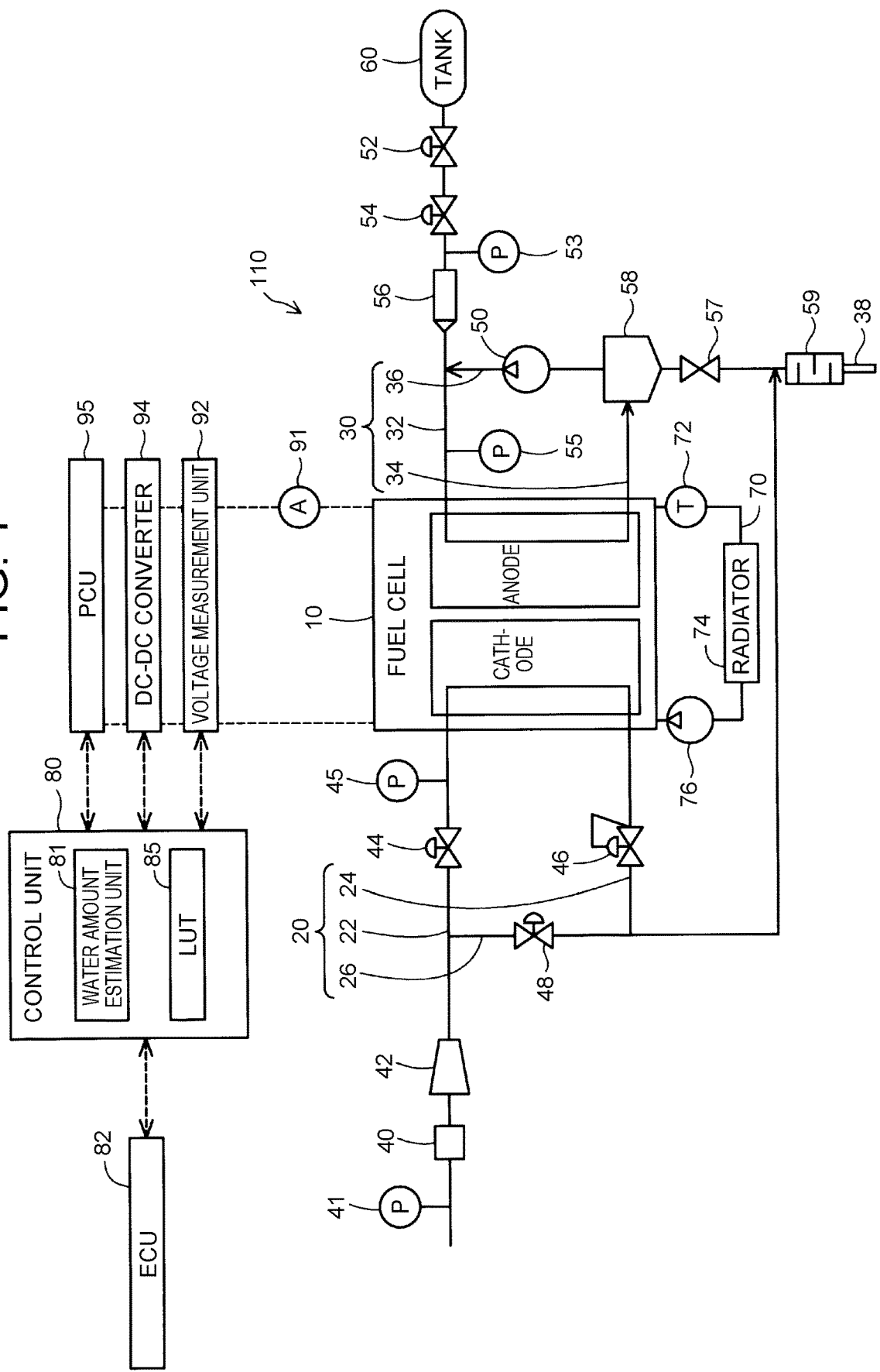
FIG. 1 is a diagram showing the configuration of a fuel cell system that is an embodiment of the present disclosure.

FIG. 1 is a diagram showing the configuration of a fuel cell system 110 that is an embodiment of the present disclosure. The fuel cell system 110 includes a fuel cell stack (hereinafter referred to simply as a "fuel cell") 10, a cathode gas passage 20, an anode gas passage 30, a cooling passage 70, and a control unit 80. In this embodiment, the fuel cell system 110 is installed in a vehicle.

For example, the fuel cell 10 is formed by stacking power generation modules each including a membrane electrode assembly (MEA) that is an electrolyte membrane with an anode electrode and a cathode electrode respectively joined to both sides. The fuel cell 10 generates electricity by an electrochemical reaction between a hydrogen gas as an anode gas that is supplied from an anode gas tank 60 and oxygen as a cathode gas that is present in the atmosphere. Instead of a hydrogen gas, for example, alcohol or hydrocarbon may be used as the anode gas.

The cathode gas passage 20 is a passage that supplies and discharges the cathode gas to and from the fuel cell 10. The cathode gas passage 20 includes a cathode gas supply passage 22 that supplies the cathode gas to the fuel cell 10, a cathode gas discharge passage 24 that discharges the cathode gas from the fuel cell 10, and a bypass passage 26 through which the cathode gas supply passage 22 and the cathode gas discharge passage 24 communicate with each other.

The cathode gas supply passage 22 is provided with an outside air pressure gauge 41, a flowmeter 40, a compressor 42, a supply valve 44, and a pressure gauge 45, in this order from an upstream side. The outside air pressure gauge 41 is a device that measures an outside air pressure. The flowmeter 40 is a device that measures the flow rate of the cathode gas taken into the fuel cell system 110. The compressor 42 is a device that compresses the cathode gas taken in and sends the compressed cathode gas to the fuel cell 10. The supply valve 44 is a valve that controls whether to allow the cathode gas to flow from the compressor 42 into the fuel cell 10, and is provided farther on a downstream side of the cathode gas supply passage 22 than a point of connection to the bypass passage 26. The pressure gauge 45 is a device that measures a pressure at a cathode gas inlet of the fuel cell 10. While the pressure gauge 45 measures the pressure at the cathode gas inlet of the fuel cell 10 in this embodiment, the present disclosure is not limited to this example. For example, the pressure gauge 45 may instead be provided in the cathode gas discharge passage 24 to measure a pressure at a cathode gas outlet of the fuel cell 10.

A pressure regulating valve 46 that regulates the pressure of the cathode gas on the cathode outlet side of the fuel cell 10 is provided farther on an upstream side of the cathode gas discharge passage 24 than a point of connection to the bypass passage 26. The bypass passage 26 is provided with a bypass valve 48 that adjusts the flow rate of the cathode gas in the bypass passage 26. In this embodiment, the bypass passage 26 is a passage that connects a point in the cathode gas supply passage 22 between the compressor 42 and the supply valve 44 and a point in the cathode gas discharge passage 24 farther on a downstream side than the pressure regulating valve 46 to each other.

The anode gas passage 30 is a passage that supplies and discharges the anode gas to and from the fuel cell 10. The anode gas passage 30 includes an anode gas supply passage 32 that supplies the anode gas to the fuel cell 10, an anode gas discharge passage 34 that discharges the anode gas from the fuel cell 10, and an anode gas circulation passage 36 through which the anode gas supply passage 32 and the anode gas discharge passage 34 communicate with each other.

The anode gas supply passage 32 is connected to the anode gas tank 60. The anode gas supply passage 32 is provided with an on-off valve 52, a regulator 54, an upstream-side pressure measurement unit 53, an injector 56, and a pressure measurement unit 55, in this order from an upstream side. The on-off valve 52 is a valve that controls whether to allow the anode gas to flow from the anode gas tank 60 to the upstream side of the injector 56. The regulator 54 is a valve that regulates the pressure of the anode gas on the upstream side of the injector 56. The injector 56 is a valve that controls inflow of the anode gas into the fuel cell 10. In this embodiment, the injector 56 is provided farther on the upstream side of the anode gas supply passage 32 than a point of communication with the anode gas circulation passage 36.

The upstream-side pressure measurement unit 53 is a device that acquires a measured pressure value of the anode gas at an inlet of the injector 56. The pressure measurement unit 55 is a device that measures a pressure at an anode gas inlet of the fuel cell 10. In this embodiment, the pressure measurement unit 55 is provided farther on a downstream side of the anode gas supply passage 32 than a point of connection to the anode gas circulation passage 36. The pressure measurement unit 55 may instead be provided in the anode gas discharge passage 34 to acquire the measured pressure value of the anode gas at an anode gas outlet of the fuel cell 10. Hereinafter, the measured pressure value measured by the pressure measurement unit 55 will be referred to also as an "anode gas pressure."

The anode gas discharge passage 34 is connected to a gas-liquid separator 58. The anode gas discharge passage 34 guides an unreacted gas (the anode gas, a nitrogen gas, etc.) that has not been used for an electrochemical reaction inside the fuel cell 10 and water generated inside the fuel cell 10 to the gas-liquid separator 58.

The gas-liquid separator 58 separates a gas and a liquid discharged from the anode of the fuel cell 10. The gas-liquid separator 58 is connected to the anode gas circulation passage 36 and a discharge pipe 38. The gas-liquid separator 58 guides an unreacted anode gas that has not been used for an electrochemical reaction inside the fuel cell 10 to the anode gas circulation passage 36, and guides water and a nitrogen gas generated inside the fuel cell 10 to the discharge pipe 38.

A pump 50 is provided in the anode gas circulation passage 36. The pump 50 pumps a gas containing the anode gas separated in the gas-liquid separator 58 to the anode gas supply passage 32. In the fuel cell system 110, the anode gas is circulated and supplied to the fuel cell 10 again to thereby increase the use efficiency of the anode gas. While the pump 50 is provided in the anode gas circulation passage 36 in this embodiment, the present disclosure is not limited to this example. For example, an ejector may instead be provided in the anode gas circulation passage 36, at a point of connection to the anode gas supply passage 32. While the anode gas circulation passage 36 is provided in this embodiment, the anode gas circulation passage 36 may be omitted.

The discharge pipe 38 is a pipe through which the liquid and the gas separated in the gas-liquid separator 58 are discharged to the outside of the fuel cell system 110. The discharge pipe 38 is provided with a discharge valve 57 that discharges gas and water and a silencer 59 that reduces the noise of discharging gas and water, in this order from an upstream side.

The cooling passage 70 is a passage provided to cool the fuel cell 10, and is a passage connecting a radiator 74 that cools a refrigerant inside the cooling passage 70 to a refrigerant passage inside the fuel cell 10. A temperature measurement unit 72 is provided farther on an upstream side of the cooling passage 70 than the radiator 74, and a pump 76 is provided farther on a downstream side of the cooling passage 70 than the radiator 74. In this embodiment, a measured temperature value of the fuel cell 10 can be acquired by the temperature measurement unit 72. However, the method of measuring the temperature of the fuel cell 10 is not limited to this example. Other examples include a method in which a temperature gauge is provided at the cathode outlet or the anode outlet of the fuel cell 10 and the temperature is measured by this temperature gauge.

A DC-DC converter 94 boosts the output voltage of the fuel cell 10 and supplies the boosted voltage to a PCU 95. Electricity generated by the fuel cell 10 is supplied through a power source circuit including the PCU 95 to loads including a driving motor that drives wheels, and to the compressor 42, the pump 50, and various valves. The PCU 95 restricts the current of the fuel cell 10 by exerting control through the control unit 80. A current measurement unit 91 that measures the current of the fuel cell 10 and a voltage measurement unit 92 that measures the voltage of the fuel cell 10 are provided between the fuel cell 10 and the DC-DC converter 94.

The control unit 80 is configured as a computer including a CPU, a memory, and an interface circuit to which the above components are connected. According to a command from an electronic control unit (ECU) 82, the control unit 80 outputs a signal for controlling start and stop of components inside the fuel cell system 110. The ECU 82 is a control unit that controls the entire vehicle including the fuel cell system 110. For example, the ECU 82 in the vehicle controls the vehicle according to an amount of depression of an accelerator pedal, an amount of depression of a brake pedal, a vehicle speed, etc. The ECU 82 may be incorporated in the control unit 80 as a part of the function thereof. The CPU controls power generation of the fuel cell system 110 by executing a control program stored in the memory.

In this embodiment, the control unit 80 estimates a water amount on the anode side. A functional unit of the control unit 80 that performs this estimation is a water amount estimation unit 81. Generally, water is present on both the anode side and the cathode side of the fuel cell 10 during power generation.

Figure 2:
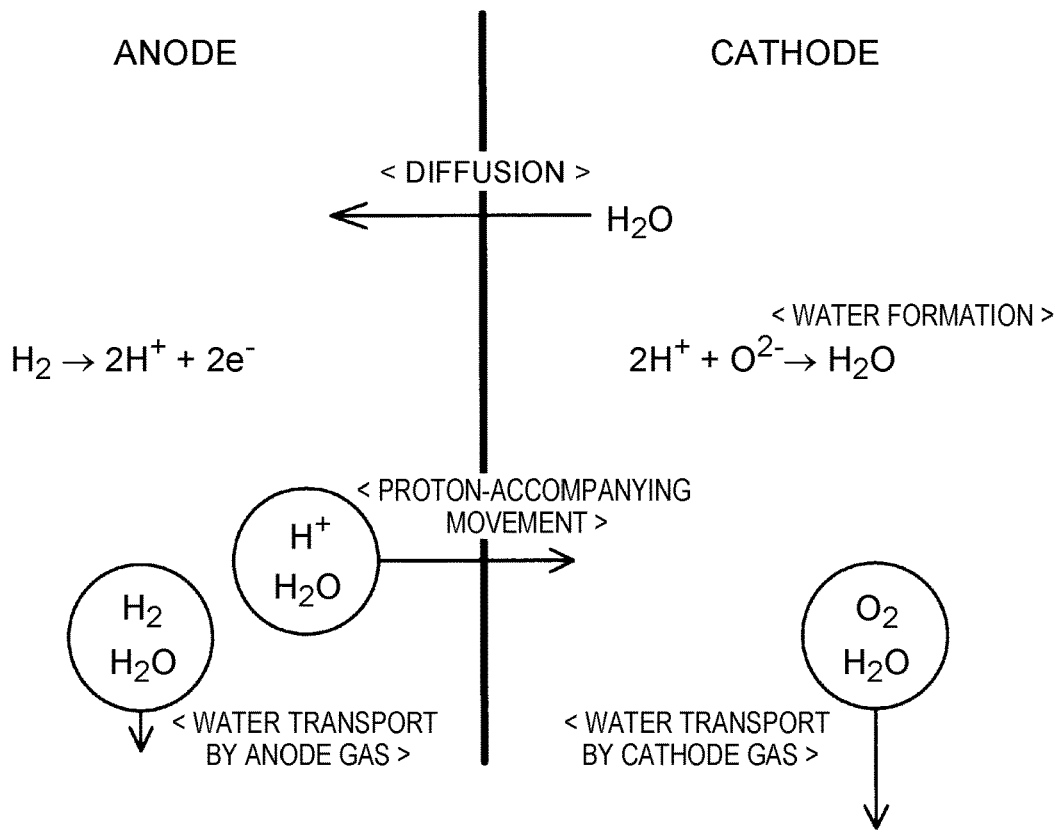
FIG. 2 is a view showing a mechanism of how water is generated on an anode side and a cathode side.

FIG. 2 is a view showing the behavior of water on the anode side and the cathode side. On the anode side, protons are generated by a reaction expressed by Formula (1) below, while on the cathode side, water is generated by a reaction expressed by Formula (2) below.

$$H_2 \rightarrow 2H^+ + 2e^- \quad (1)$$

$$2H^+ + O^{2-} \rightarrow H_2O \quad (2)$$

In parallel with the above reactions, part of the water generated by the reaction of Formula (2) moves from the cathode side toward the anode side by diffusion due to a difference in water concentration between the anode side and the cathode side. Similarly, in parallel with the above reactions, part of the water moves from the anode side toward the cathode side as the protons generated by the reaction of Formula (1) move from the anode side toward the cathode side. This phenomenon is also called "proton-accompanying movement." The water on the anode side is carried away by the anode gas and discharged, while the water on the cathode side is carried away by the cathode gas and discharged.

Generally, the flow rate of the anode gas inside the fuel cell 10 is lower than the flow rate of the cathode gas inside the fuel cell 10. Accordingly, the amount of water that is discharged to the outside of the fuel cell 10 as the anode gas is discharged from the fuel cell 10 to the anode gas discharge passage 34 is smaller than the amount of water that is discharged to the outside of the fuel cell 10 as the cathode gas is discharged from the fuel cell 10 to the cathode gas discharge passage 24. Thus, once water has accumulated on the anode side, this makes it difficult to supply the anode gas to the anode. As a result, the progress of the reaction of Formula (1) is inhibited, and the movement of the water accompanying the movement of the protons from the anode side toward the cathode side is also inhibited. Therefore, to maintain the power generation efficiency of the fuel cell 10 at a good level, it is preferable to maintain the water amount on the anode side at an appropriate amount, and to do so, it is preferable to first of all estimate the water amount on the anode side.

In this embodiment, the control unit 80 estimates whether the water amount on the anode side is larger than a predetermined water amount threshold value by using a rise of the anode gas pressure resulting from opening the injector 56. The mechanism of this estimation will be described below. While in this embodiment the water amount threshold value is a water amount corresponding to 10% of the volume on the anode side of the fuel cell 10, the present disclosure is not limited to this example. For example, the water amount threshold value may instead be a water amount corresponding to 5% of the volume on the anode side of the fuel cell 10 or a water amount corresponding to 15% of the volume on the anode side of the fuel cell 10.

Figure 3:
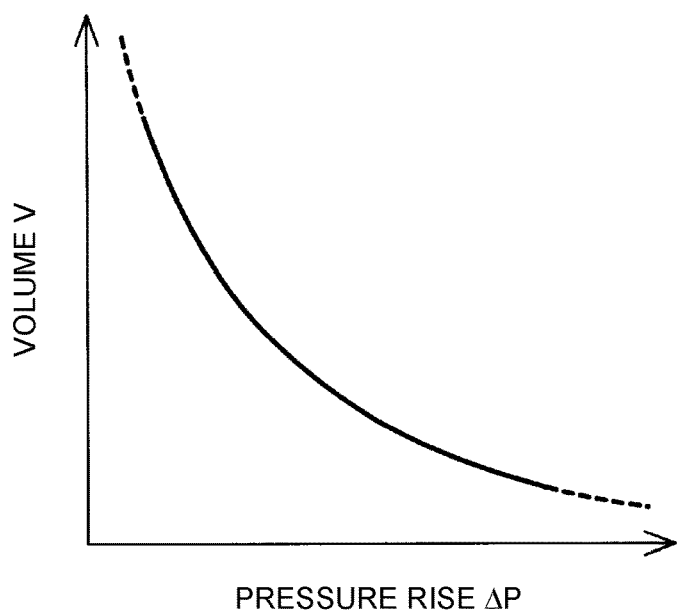
FIG. 3 is a graph showing a relationship between a volume on the anode side and a rise of an anode gas pressure.

FIG. 3 is a graph showing a relationship between a volume V on the anode side of the fuel cell 10 and a rise ΔP of the anode gas pressure per unit time. From Boyle's law, when the mass of the anode gas entering the fuel cell 10 as a result of opening the injector 56 and the temperature condition inside the fuel cell 10 remain unchanged, the product of the volume V and the pressure rise ΔP remains substantially constant, with the pressure rise ΔP substantially inversely proportional to the volume V. As the amount of water accumulating on the anode side increases, the volume V that can accommodate a gas on the anode side of the fuel cell 10 decreases, and the pressure rise ΔP increases in inverse proportion to the decrease of the volume V. In this embodiment, this phenomenon is used to estimate the water amount on the anode side.

Figure 4:
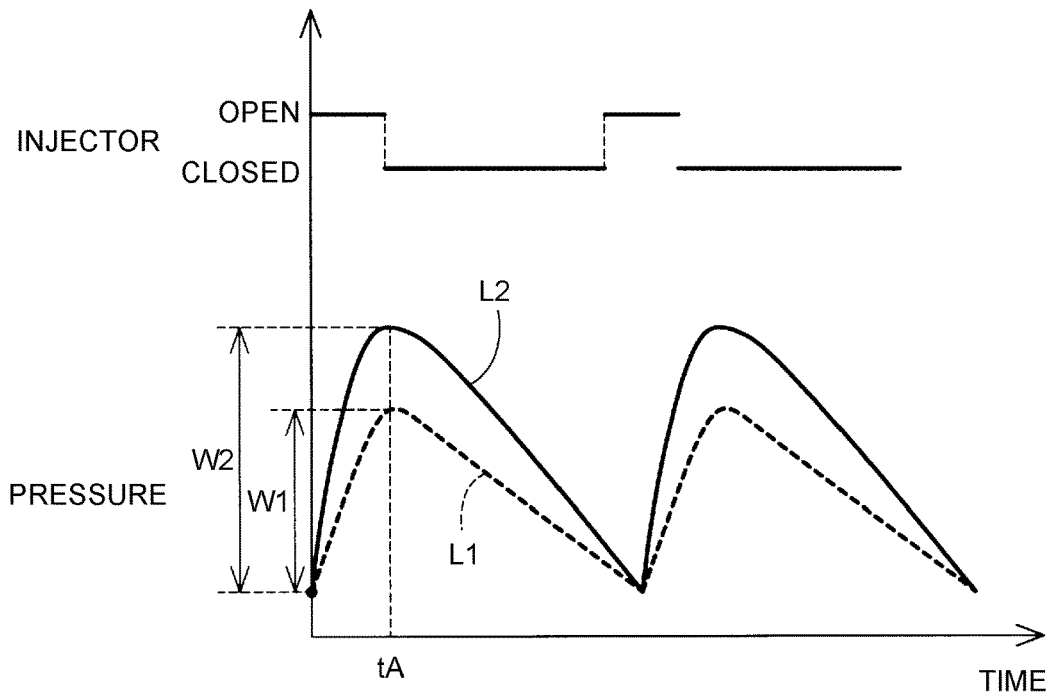
FIG. 4 is a graph showing opening and closing of an injector and changes in the anode gas pressure.

FIG. 4 is a graph showing opening and closing of the injector 56 and changes in the anode gas pressure. As shown in FIG. 4, when the injector 56 is opened, the anode gas pressure measured by the pressure measurement unit 55 rises rapidly, and when the injector 56 is closed, the anode gas pressure decreases gradually.

In FIG. 4, the dashed line L1 represents the anode gas pressure when the power generation efficiency of the fuel cell 10 is good. In other words, the dashed line L1 represents the anode gas pressure when the water amount on the anode side is an appropriate water amount. On the other hand, the solid line L2 represents the anode gas pressure when the water amount on the anode side is larger than an appropriate water amount. As can be seen from FIG. 4, a pressure rise W2 per unit time to when the water amount on the anode side is larger than an appropriate water amount (the case of the solid line L2) is larger than a pressure rise W1 per unit time tA when the water amount on the anode side is an appropriate water amount (the case of the dashed line L1). Here, the rise of the anode gas pressure refers to a value obtained by subtracting a minimum value of the anode gas pressure from a maximum value thereof, both measured during the course of the unit time tA from when the anode gas pressure starts to rise as a result of opening the injector 56. While the unit time is one second in this embodiment, the present disclosure is not limited to this example. For example, the unit time may instead be 0.1 seconds, five seconds, or ten seconds. Alternatively, the unit time tA may be set to a sufficiently short time, and the inclination of the rise of the anode gas pressure resulting from opening the injector 56 may be used as the rise of the anode gas pressure.

Figure 5:
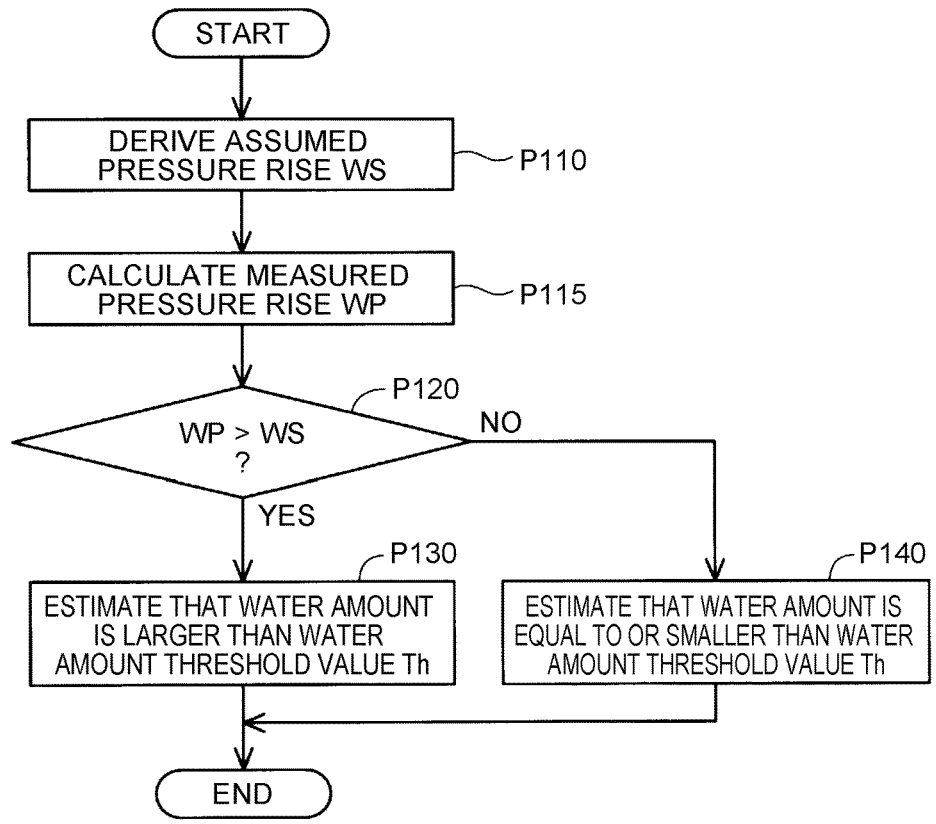
FIG. 5 is a flowchart illustrating a step of estimating a water amount on the anode side.

FIG. 5 is a flowchart illustrating a step of estimating the water amount on the anode side that is executed by the control unit 80. This process is executed constantly and repeatedly while the fuel cell system 110 is in operation.

First, the control unit 80 derives an assumed pressure rise WS that is an assumed rise of the anode gas pressure resulting from opening the injector 56 (step P110). The assumed pressure rise WS is a rise of the anode gas pressure that is assumed from a plurality of circumstantial parameters, based on the water amount on the anode side being equal to a predetermined water amount threshold value. Parameters that have significant influence on the anode gas pressure resulting from opening the injector 56 are used as the circumstantial parameters. In this embodiment, the circumstantial parameters include an open time of the injector 56 and the anode gas pressure measured before the injector 56 is opened. In this embodiment, the control unit 80 derives the assumed pressure rise WS from the circumstantial parameters by using a look-up table 85. However, the present disclosure is not limited to this example, and the assumed pressure rise WS may instead be calculated by using a function having the circumstantial parameters as variables. In this embodiment, the look-up table 85 is stored in the control unit 80 in advance.

The circumstantial parameters are not limited to the open time of the injector 56 and the anode gas pressure measured before the injector 56 is opened. For example, at least one of the measured temperature value of the fuel cell 10 acquired by the temperature measurement unit 72, the rotation speed of the pump 50 provided in the anode gas circulation passage 36, and the pressure on the inlet side of the injector 56 measured by the upstream-side pressure measurement unit 53, may be additionally used as the circumstantial parameters. These circumstantial parameters can also be disregarded. However, using these circumstantial parameters in deriving the assumed pressure rise WS can further improve the accuracy with which the water amount on the anode side is estimated.

After deriving the assumed pressure rise WS (step P110), the control unit 80 calculates a measured pressure rise WP from the actual anode gas pressure (step P115), and determines whether the measured pressure rise WP is larger than the assumed pressure rise WS (step P120). In this embodiment, the control unit 80 uses, as the measured pressure rise WP, a value obtained by subtracting a minimum value of the anode gas pressure from a maximum value thereof, both measured during the course of the unit time to from when the anode gas pressure starts to rise as a result of opening the injector 56. In this embodiment, the control unit 80 derives the measured pressure rise WP from the anode gas pressure measured by the pressure measurement unit 55.

When the measured pressure rise WP is larger than the assumed pressure rise WS, the control unit 80 estimates that the water amount on the anode side of the fuel cell 10 is larger than a water amount threshold value Th (step P130), and ends the processing flow. On the other hand, when the measured pressure rise WP is equal to or smaller than the assumed pressure rise WS, the control unit 80 estimates that the water amount on the anode side of the fuel cell 10 is equal to or smaller than the water amount threshold value Th (step P140), and ends the processing flow.

The fuel cell system of this embodiment can estimate the water amount on the anode side of the fuel cell 10 by using a rise of the anode gas pressure resulting from opening the injector 56.

B. Second Embodiment

Figure 6:
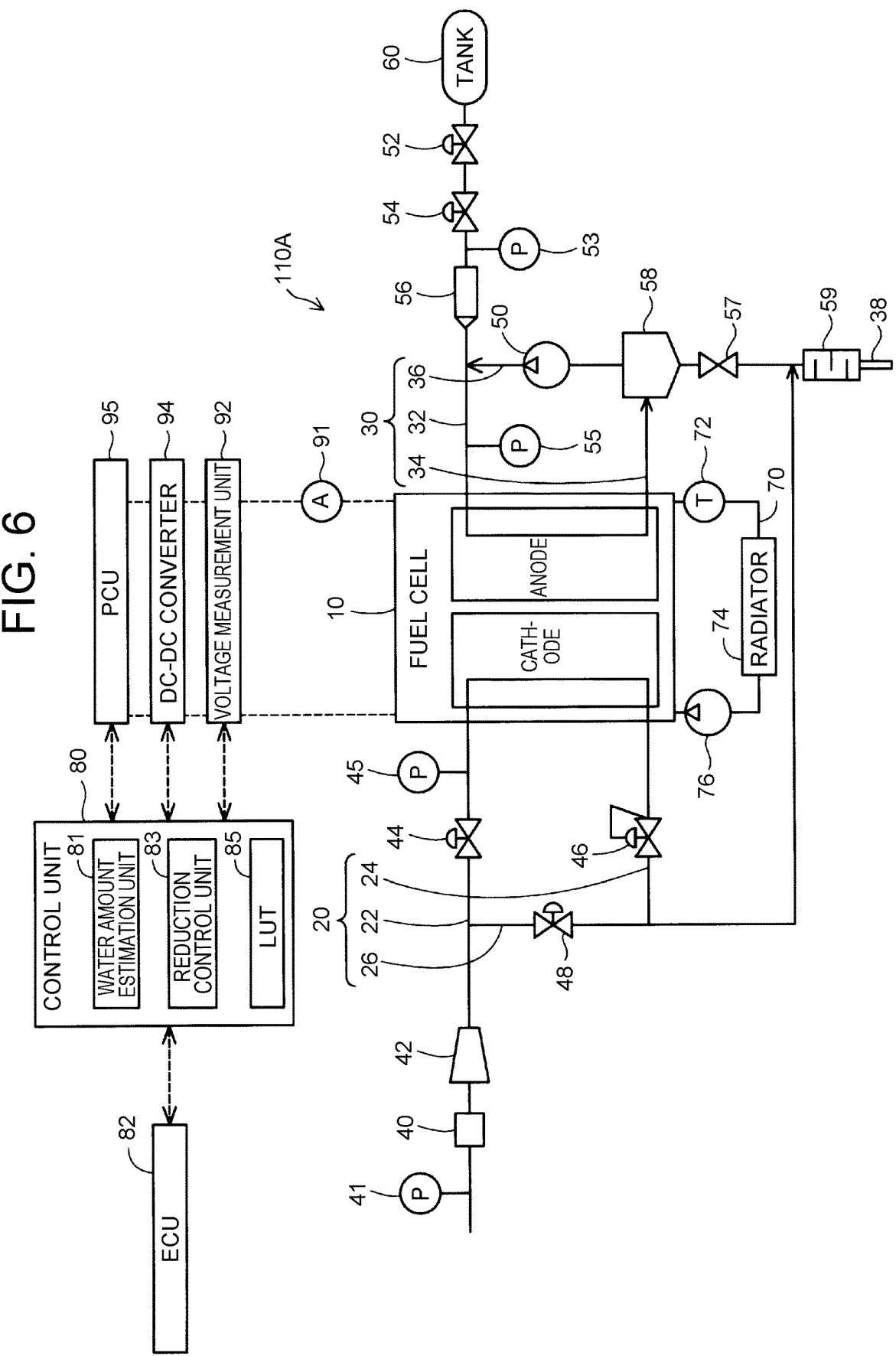
FIG. 6 is a diagram showing the configuration of a fuel cell system in a second embodiment.

FIG. 6 is a diagram showing the configuration of a fuel cell system 110A in a second embodiment. FIG. 7 is a flowchart in the second embodiment. The second embodiment is different from the first embodiment in that step P135 is further performed after step P130 and that a reduction control unit 83 that performs reduction control, to be described later, is included in the control unit 80, but is otherwise the same as the first embodiment.

In the second embodiment, when the control unit 80 estimates that the water amount on the anode side of the fuel cell 10 is larger than the water amount threshold value Th (step P130), the control unit 80 performs the reduction control of reducing the water amount on the anode side of the fuel cell 10 (step P135). In this embodiment, the control unit 80 performs, as the reduction control, control of increasing the rotation speed of the pump 50 compared with that when the reduction control is not performed. Thus, water is discharged to the outside of the fuel cell 10 as the anode gas is discharged from the fuel cell 10 to the anode gas discharge passage 34, and thereby the water amount on the anode side of the fuel cell 10 is reduced. However, the present disclosure is not limited to this example. For example, the control unit 80 may instead perform, as the reduction control, control of increasing the open time of the injector 56 compared with that when the reduction control is not performed, to thereby reduce the water amount on the anode side of the fuel cell 10. By including the reduction control, the second embodiment can reduce the water amount on the anode side.

The present disclosure is not limited to the above embodiments but can be realized in various configurations within the scope of the gist of the disclosure. For example, the technical characteristics in the embodiments corresponding to the technical characteristics in the aspects described in SUMMARY can be substituted or combined as appropriate to solve part or the whole of the problem or to achieve part or the whole of the effect. Unless described as essential in this specification, a technical characteristic can be omitted as appropriate.

What is claimed is:

1. A fuel cell system comprising:
   a fuel cell that generates electricity by an electrochemical reaction between an anode gas and a cathode gas;
   an anode gas supply passage that supplies the anode gas to the fuel cell;
   an injector provided in the anode gas supply passage;
   a pressure measurement unit that acquires a measured pressure value of the anode gas at an anode gas inlet or an anode gas outlet of the fuel cell; and
   a water amount estimation unit configured to estimate whether a water amount on an anode side of the fuel cell is larger than a predetermined threshold value,
   wherein the water amount estimation unit is configured to obtain, from a plurality of circumstantial parameters including an open time of the injector and the measured pressure value measured before the injector is opened, an assumed pressure rise that is assumed based on the water amount being equal to the predetermined threshold value, and
   when a measured pressure rise of the measured pressure value resulting from opening the injector is larger than the assumed pressure rise, the water amount estimation unit is configured to estimate that the water amount is larger than the predetermined threshold value.

2. The fuel cell system according to claim 1, further comprising a temperature measurement unit configured to acquire a measured temperature value of the fuel cell, wherein the plurality of circumstantial parameters includes the measured temperature value.

3. The fuel cell system according to claim 1, further comprising a reduction control unit configured to perform reduction control of reducing the water amount when the water amount is estimated to be larger than the predetermined threshold value.

4. A control method of a fuel cell system including a fuel cell that generates electricity by an electrochemical reaction between an anode gas and a cathode gas, an anode gas supply passage that supplies an anode gas to the fuel cell, and an injector provided in the anode gas supply passage, the control method comprising:
  obtaining, from a plurality of circumstantial parameters including an open time of the injector and a measured pressure value at an anode gas inlet or an anode gas outlet of the fuel cell measured before the injector is opened, an assumed pressure rise that is assumed based on a water amount on an anode side of the fuel cell being equal to a predetermined threshold value; and
  when a measured pressure rise of the measured pressure value resulting from opening the injector is larger than the assumed pressure rise, estimating that the water amount is larger than the predetermined threshold value.

\* \* \* \* \*